US012312842B2

(12) United States Patent
Boyer et al.

(10) Patent No.: US 12,312,842 B2
(45) Date of Patent: May 27, 2025

(54) STRIKER ASSEMBLY FOR A VEHICLE

(71) Applicant: Rivian IP Holdings, LLC, Irvine, CA (US)

(72) Inventors: David Boyer, Irvine, CA (US); Shubham Kulkarni, Irvine, CA (US); Revathi Krishnamoorthy, Rancho Santa Margarita, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 122 days.

(21) Appl. No.: 18/089,889

(22) Filed: Dec. 28, 2022

(65) Prior Publication Data

US 2024/0218714 A1 Jul. 4, 2024

(51) Int. Cl.
*E05B 85/04* (2014.01)

(52) U.S. Cl.
CPC .................................. *E05B 85/045* (2013.01)

(58) Field of Classification Search
CPC ............................... E05B 85/04; E05B 85/045
See application file for complete search history.

(56) References Cited

U.S. PATENT DOCUMENTS

2019/0277070 A1* 9/2019 Aldersley ............. E05B 85/045

FOREIGN PATENT DOCUMENTS

| | | | | | |
|---|---|---|---|---|---|
| DE | 102005034098 | A1 * | 1/2007 | | B60R 21/38 |
| DE | 102018007926 | A1 * | 2/2020 | | |
| FR | 2966486 | A1 * | 4/2012 | | E05B 17/0062 |
| JP | 2000104425 | A * | 4/2000 | | |
| KR | 20050021161 | A * | 3/2005 | | |
| KR | 20100019612 | A * | 2/2010 | | |

OTHER PUBLICATIONS

Computer Generated Translation for DE 102018007926 A1, Generated on Aug. 13, 2024, https://worldwide.espacenet.com/ (Year: 2024).*

* cited by examiner

*Primary Examiner* — Alyson M Merlino
(74) *Attorney, Agent, or Firm* — Foley & Lardner LLP

(57) ABSTRACT

A striker assembly for a vehicle. The striker of the striker assembly, when retained within the associated latch mechanism, is configured to collapse towards the exterior surface of the associated hood, tailgate, or other door such that the exterior surface of the hood, tailgate, or other door is allowed to deflect inwards without the striker significantly contacting the exterior surface and becoming a point of contact for an impacting object causing the inwards deflection of the exterior surface. The striker assembly utilizes a reinforcement plate with a pair of deflection tabs or the like to enable this functionality, the striker contacting the pair of deflection tabs and being allowed to translate through the associated attachment plate of the striker assembly when hood impact occurs.

17 Claims, 9 Drawing Sheets

STRIKER ASSEMBLY FOR A VEHICLE

INTRODUCTION

The present disclosure relates generally to the automotive field. More particularly, the present disclosure relates to a striker assembly for a vehicle.

A striker assembly is typically used to secure a hood, tailgate, or other door of a vehicle in a closed configuration, the striker being retained within an associated latch mechanism. In many applications, it is desirable that an exterior surface of the hood, tailgate, or other door is contacted or deflects without the striker rigidly contacting and/or restraining the exterior surface and becoming a point of contact for an impacting object causing the inwards deflection of the exterior surface.

The present introduction is provided as illustrative environmental context only and should not be construed to be limiting in any manner. It will be readily apparent to those of ordinary skill in the art that the concepts and principles of the present disclosure may be applied in other environmental contexts equally.

SUMMARY

The present disclosure relates to a striker assembly for a vehicle. The striker of the striker assembly, when retained within the associated latch mechanism, is configured to collapse towards the exterior surface of the associated hood, tailgate, or other door (i.e., closure) such that the exterior surface of the hood, tailgate, or other door is contacted or deflects without the striker significantly rigidly contacting and/or restraining the exterior surface and becoming a point of contact for an impacting object causing the inwards deflection of the exterior surface. The striker assembly utilizes a reinforcement plate with a pair of deflection tabs or the like to enable this functionality, the striker contacting the pair of deflection tabs and being allowed to translate through the associated attachment plate of the striker assembly when hood impact occurs.

In one illustrative embodiment, the present disclosure provides a striker assembly for a vehicle, including: an attachment plate adapted to be coupled to a reinforcement plate of a hood, tailgate, or other door (i.e., closure) of the vehicle; and a striker including an arm coupled the attachment plate, wherein the arm is adapted to translate through a hole defined by the attachment plate when the attachment plate and the striker are compressed together. The arm is adapted to contact a deflection tab coupled to the reinforcement plate when the attachment plate and the striker are compressed together and the arm translates through the hole defined by the attachment plate, thereby deflecting the deflection tab towards an exterior surface of the hood, tailgate, or other door. In a more specific embodiment, the striker is a U-shaped member including a pair of arms, wherein each of the pair of arms is adapted to translate through an associated hole defined by the attachment plate when the attachment plate and the striker are compressed together. Each of the pair of arms is adapted to contact an associated deflection tab coupled to the reinforcement plate when the attachment plate and the striker are compressed together and each of the pair of arms translates through the associated hole defined by the attachment plate, thereby deflecting the associated deflection tab towards an exterior surface of the hood, tailgate, or other door. The attachment plate defines a plurality of holes adapted to receive a plurality of fasteners for coupling the attachment plate to the reinforcement plate. The reinforcement plate is adapted to be coupled to an interior of an exterior surface of the hood, tailgate, or other door. The striker is adapted to be retained within a latch mechanism coupled to the vehicle when the hood, tailgate, or other door is in a closed configuration.

In another illustrative embodiment, the present disclosure provides a hood of a vehicle, including: an exterior surface; a reinforcement plate coupled to an interior of the exterior surface; an attachment plate coupled to the reinforcement plate; and a striker including an arm coupled to the attachment plate, wherein the arm is adapted to translate through a hole defined by the attachment plate when the attachment plate and the striker are compressed together. The reinforcement plate includes a deflection tab, wherein the arm is adapted to contact the deflection tab when the attachment plate and the striker are compressed together and the arm translates through the hole defined by the attachment plate, thereby deflecting the deflection tab towards the exterior surface. In a more specific embodiment, the striker is a U-shaped member including a pair of arms, wherein each of the pair of arms is adapted to translate through an associated hole defined by the attachment plate when the attachment plate and the striker are compressed together. The reinforcement plate includes a pair of deflection tabs, wherein each of the pair of arms is adapted to contact an associated deflection tab when the attachment plate and the striker are compressed together and each of the pair of arms translates through the associated hole defined by the attachment plate, thereby deflecting the associated deflection tab towards the exterior surface. The attachment plate defines a plurality of holes adapted to receive a plurality of fasteners for coupling the attachment plate to the reinforcement plate. The striker is adapted to be retained within a latch mechanism coupled to the vehicle when the hood is in a closed configuration. As used here, “hood” also refers to a tailgate, door, or the like of a vehicle.

In a further illustrative embodiment, the present disclosure provides a method of providing a hood of a vehicle, including: providing an exterior surface; coupling a reinforcement plate to an interior of the exterior surface; coupling an attachment plate to the reinforcement plate; and coupling a striker including an arm to the attachment plate, wherein the arm is adapted to translate through a hole defined by the attachment plate when the attachment plate and the striker are compressed together. The reinforcement plate includes a deflection tab, wherein the arm is adapted to contact the deflection tab when the attachment plate and the striker are compressed together and the arm translates through the hole defined by the attachment plate, thereby deflecting the deflection tab towards the exterior surface. In a more specific embodiment, the striker is a U-shaped member including a pair of arms, wherein each of the pair of arms is adapted to translate through an associated hole defined by the attachment plate when the attachment plate and the striker are compressed together. The reinforcement plate includes a pair of deflection tabs, wherein each of the pair of arms is adapted to contact an associated deflection tab when the attachment plate and the striker are compressed together and each of the pair of arms translates through the associated hole defined by the attachment plate, thereby deflecting the associated deflection tab towards the exterior surface. The attachment plate defines a plurality of holes adapted to receive a plurality of fasteners for coupling the attachment plate to the reinforcement plate. The striker is adapted to be retained within a latch mechanism coupled to the vehicle when the hood is in a closed configuration. The method also includes forming the deflection tab by cutting the deflection tab within an interior portion of the reinforcement plate. As used here, "hood" also refers to a tailgate, door, or the like of a vehicle.

BRIEF DESCRIPTION OF THE DRAWINGS

The present disclosure is illustrated and described with reference to the various drawings, in which like reference numbers are used to denote like assembly components/method steps, as appropriate, and in which.

DETAILED DESCRIPTION

The present disclosure relates to a striker assembly for a vehicle. The striker of the striker assembly, when retained within the associated latch mechanism, is configured to collapse towards the exterior surface of the associated hood, tailgate, or other door (i.e., closure) such that the exterior surface of the hood, tailgate, or other door is contacted or deflects without the striker rigidly contacting and/or restraining the exterior surface and becoming a point of contact for an impacting object causing the inwards deflection of the exterior surface. The striker assembly utilizes a reinforcement plate with a pair of deflection tabs or the like to enable this functionality, the striker contacting the pair of deflection tabs and being allowed to translate through the associated attachment plate of the striker assembly when hood impact occurs.

Figure 1:
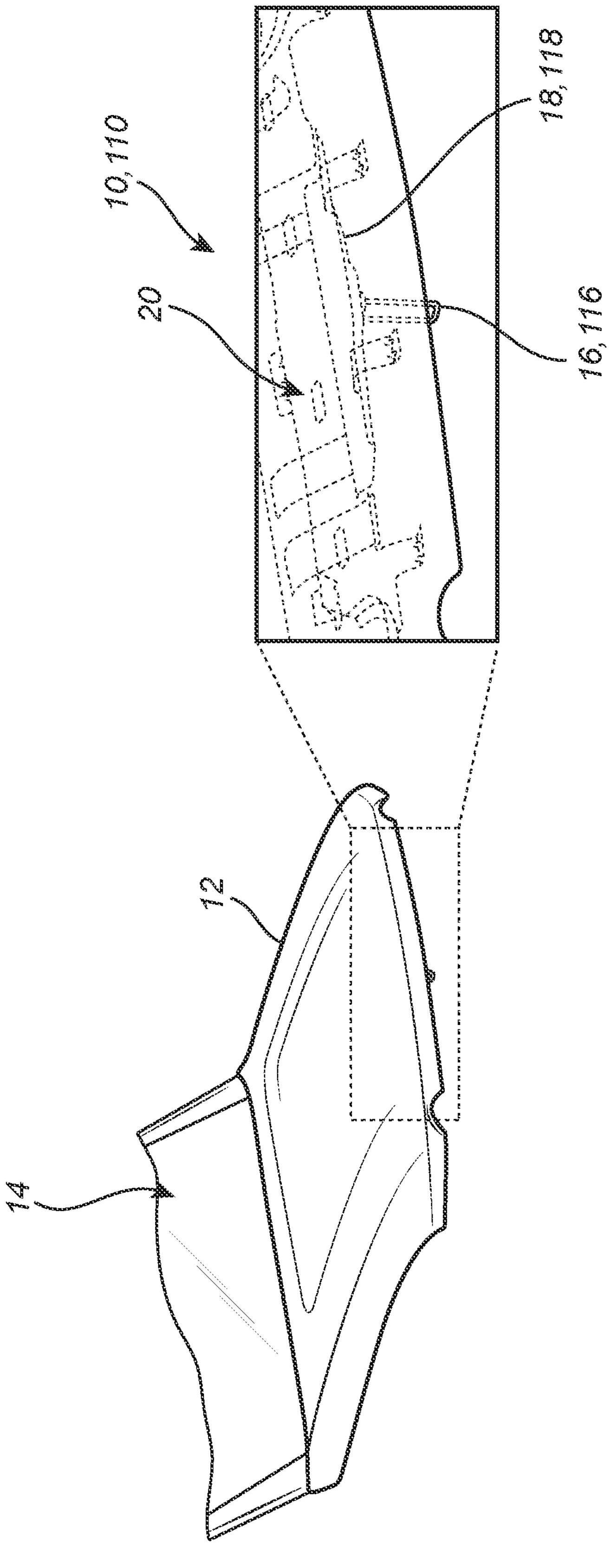
FIG. 1 is a partially transparent perspective view illustrating the general placement of a conventional striker assembly, as well as the striker assembly of the present disclosure, in a hood of a vehicle.

FIG. 1 is a partially transparent perspective view illustrating the general placement of a conventional striker assembly 10, as well as the striker assembly 110 of the present disclosure, in a hood 12 of a vehicle 14. In general, the striker assembly 10, 110 includes a striker 16, 116 coupled to a reinforcement plate 18, 118 that is secured to the interior of an exterior surface 20 of the hood. 12, typically in a front, central portion of the exterior surface 20. The striker 16, 116 is adapted to be retained within a latch mechanism coupled to the vehicle 14 when the hood 12 is in a closed configuration. Similar striker assemblies 10, 110 are also used for vehicle tailgates and other doors, and it is contemplated that the striker assembly 110 of the present disclosure may be used with any of these equally. "Hood" is used herein for simplicity and convenience only.

With a conventional striker assembly 10, the exterior surface 20 of the hood 12 is undesirably contacted and/or deflected inwards with the striker 16 rigidly contacting and restraining the exterior surface 20 and becoming a point of contact for an impacting object causing the inwards deflection of the exterior surface 20. With the striker assembly 110 of the present disclosure, the striker 116, when retained within the associated latch mechanism, is configured to collapse towards the exterior surface 20 of the hood 12 such that the exterior surface 20 is contacted and/or deflected inwards without the striker 116 rigidly contacting and/or restraining the exterior surface 20 and becoming a point of contact for an impacting object causing the inwards deflection of the exterior surface 20. In other words, the striker 116 is collapsible, and not rigid such that it becomes a point of contact for or through the exterior surface 20. When an object impacts the hood 12, the striker 116 collapses to a degree, thereby preventing it from becoming a point of contact for the object through the exterior surface 20. Rather, the overall thickness of the external surface 20, reinforcement plate 118, and striker 116 is able to contract, providing a desirable degree of "give" before the object actually contacts the striker 116.

Figure 2:
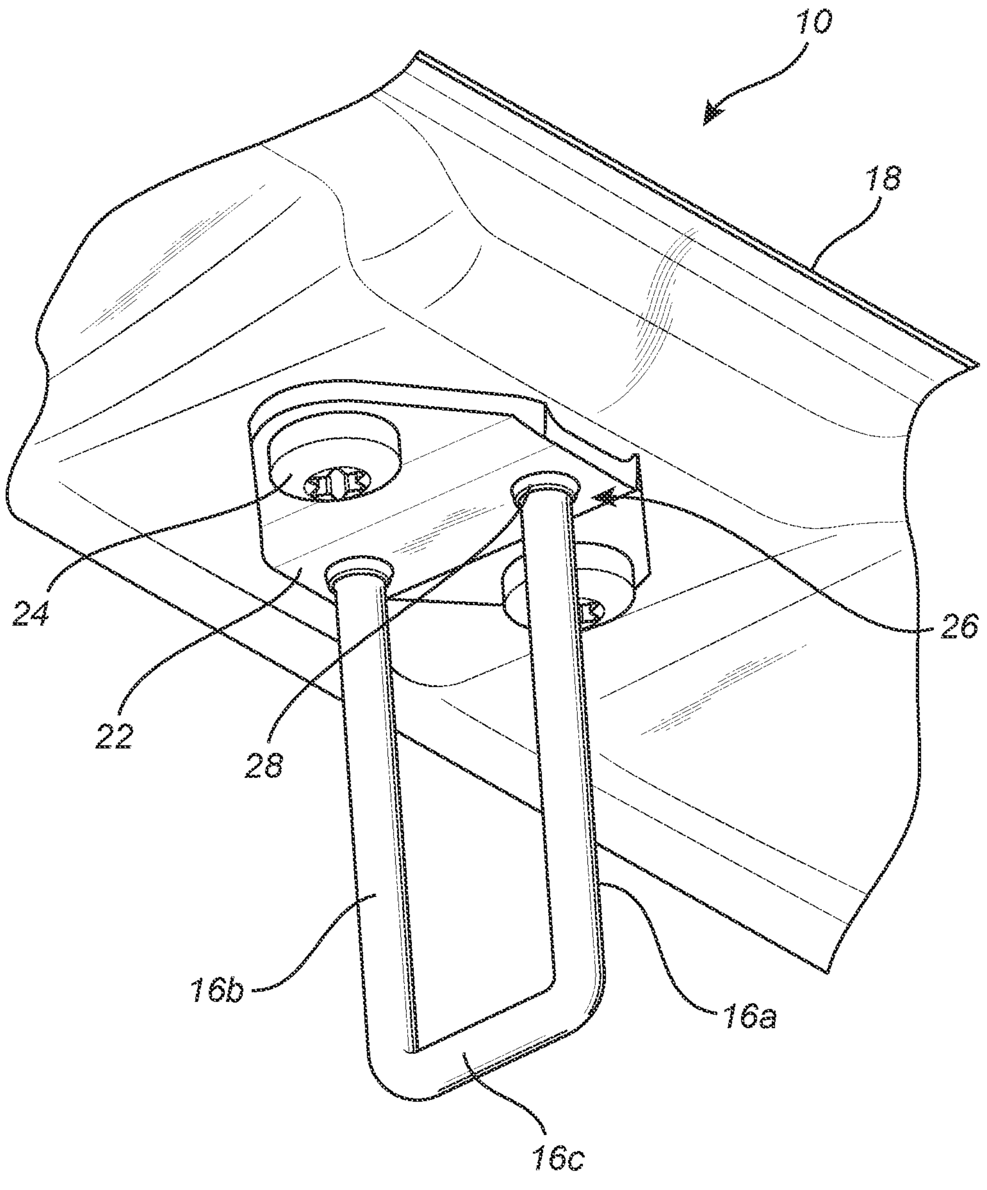
FIG. 2 is a perspective view illustrating a conventional striker assembly coupled to the reinforcement plate of a hood of a vehicle.

FIG. 2 is a perspective view illustrating a conventional striker assembly 10 coupled to the reinforcement plate 18 of a hood 12 (FIG. 1) of a vehicle 14 (FIG. 1). The reinforcement plate 18 is an elongate structure that is secured to the interior of the exterior surface 20 (FIG. 1) of the hood 12. The reinforcement plate 18 has a concave shape such that a space is created between the reinforcement plate 18 and the exterior surface 20, allowing for attachment of the striker assembly 10 to the reinforcement plate 18 without interference of the exterior surface 20. The reinforcement plate 18 is typically manufactured from steel or another metal and may run any width of the hood 12. An attachment plate 22, also typically made of steel or another metal, is secured to the reinforcement plate 18 using a plurality of fasteners 24, such as nuts and bolts or the like. All of these metallic components may also be welded.

The striker 16 includes a plurality of arms, including a front arm **16*a* and a rear arm 16*b* joined by a center section 16*c*, thereby forming a U-shaped structure. An end of each of the front arm 16*a* and the rear arm 16*b* is inserted into a hole 26 manufactured into the attachment plate 22, and the joints are welded or otherwise secured such that the striker 16 is rigidly affixed to the attachment plate 22. A pair of collars 28 may be used at these joints to increase their rigidity. As mentioned above, the striker 16 is adapted to be retained within a latch mechanism coupled to the vehicle 14 when the hood 12 is in a closed configuration. The rigid connection between the striker 16 and the attachment plate 22, reinforcement plate 18, and exterior surface 20 results in the striker 16 becoming a potential point of contact, indirectly or directly, when an object contacts the exterior surface 20 from outside the vehicle 14** with sufficient force.

Figure 3:
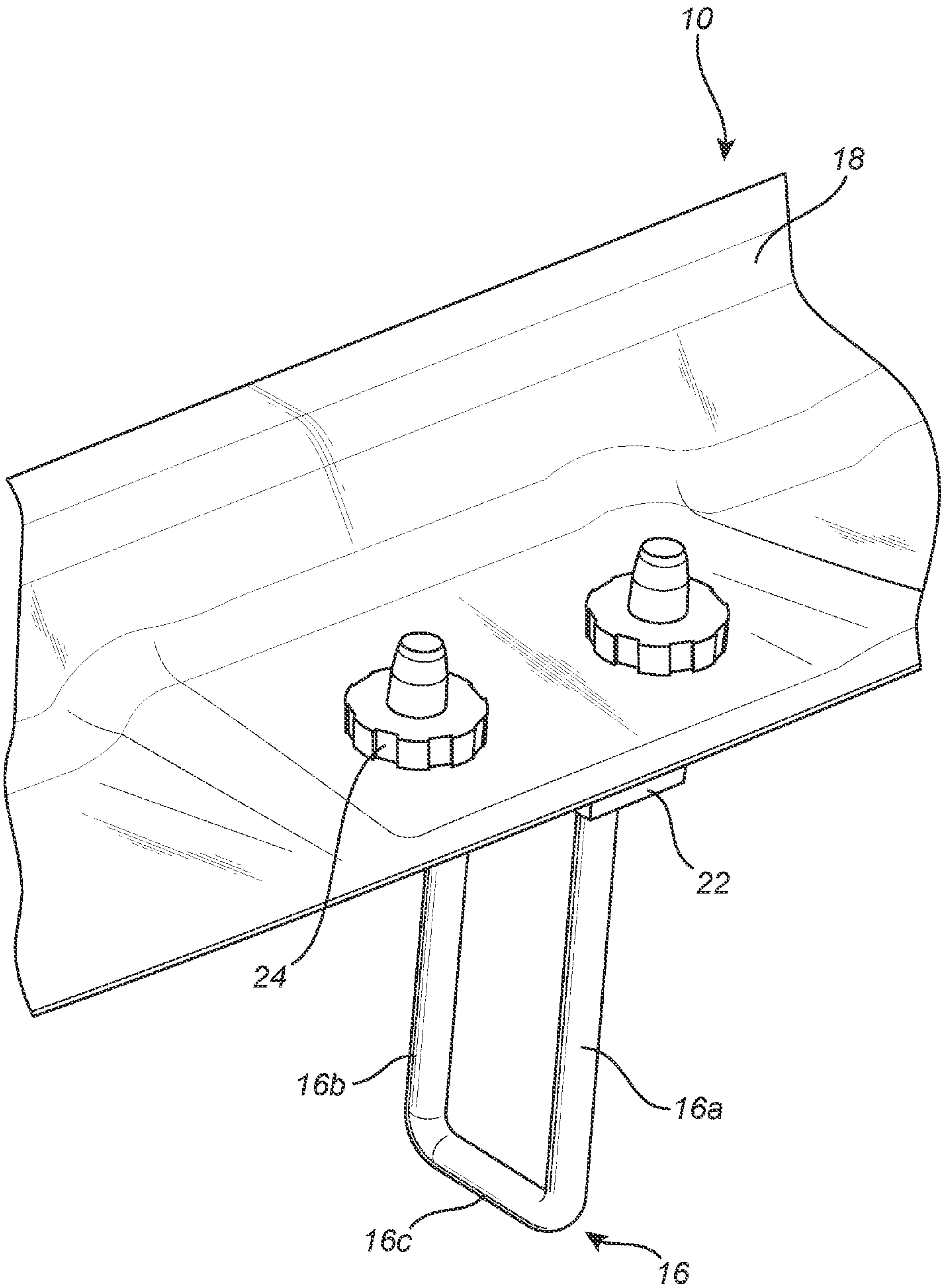
FIG. 3 is another perspective view illustrating the conventional striker assembly coupled to the reinforcement plate of the hood of the vehicle.

FIG. 3 is another perspective view illustrating the conventional striker assembly 10 coupled to the reinforcement plate 18 of the hood 12 (FIG. 1) of the vehicle 14 (FIG. 1). Again, the reinforcement plate 18 is an elongate structure that is secured to the interior of the exterior surface 20 (FIG. 1) of the hood 12. The reinforcement plate 18 has a concave shape such that a space is created between the reinforcement plate 18 and the exterior surface 20, allowing for attachment of the striker assembly 10 to the reinforcement plate 18 without interference of the exterior surface 20. The reinforcement plate 18 is typically manufactured from steel or another metal and may run any width of the hood 12. An attachment plate 22, also typically made of steel or another metal, is secured to the reinforcement plate 18 using a plurality of fasteners 24, such as nuts and bolts or the like. All of these metallic components may also be welded. Here, the back of the fasteners 24 (e.g., the nuts) is/are accommodated within the space created between the reinforcement plate 18 and the exterior surface 20.

Again, the striker 16 includes a plurality of arms, including a front arm 16*a* and a rear arm 16*b* joined by a center section 16*c*, thereby forming a U-shaped structure. An end of each of the front arm 16*a* and the rear arm 16*b* is inserted into a hole 26 (FIG. 2) manufactured into the attachment plate 22, and the joints are welded or otherwise secured such that the striker 16 is rigidly affixed to the attachment plate 22. A pair of collars 28 (FIG. 2) may be used at these joints to increase their rigidity. As mentioned above, the striker 16 is adapted to be retained within a latch mechanism coupled to the vehicle 14 when the hood 12 is in a closed configuration. The rigid connection between the striker 16 and the attachment plate 22, reinforcement plate 18, and exterior surface 20 results in the striker 16 becoming a potential point of contact, indirectly or directly, when an object contacts the exterior surface 20 from outside the vehicle 14 with sufficient force.

Figure 4:
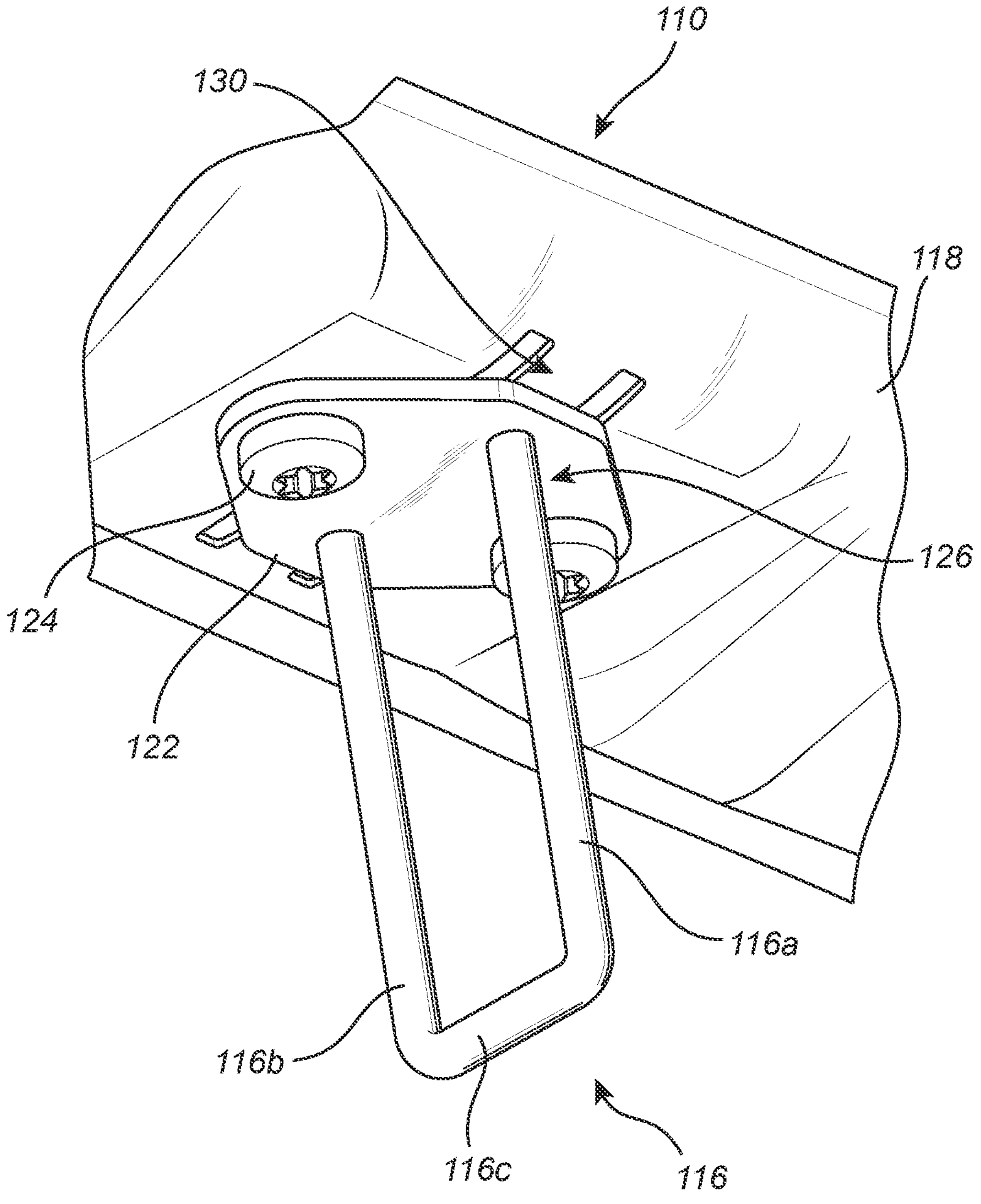
FIG. 4 is a perspective view illustrating one embodiment of the striker assembly of the present disclosure coupled to the reinforcement plate of a hood of a vehicle.

FIG. 4 is a perspective view illustrating one embodiment of the striker assembly 110 of the present disclosure coupled to the reinforcement plate 118 of a hood 12 (FIG. 1) of a vehicle 14 (FIG. 1). Again, the reinforcement plate 118 is an elongate structure that is secured to the interior of the exterior surface 20 (FIG. 1) of the hood 12. The reinforcement plate 118 has a concave shape such that a space is created between the reinforcement plate 118 and the exterior surface 20, allowing for attachment of the striker assembly 110 to the reinforcement plate 118 without interference of the exterior surface 20. The reinforcement plate 118 is typically manufactured from steel or another metal and may run any width of the hood 12. An attachment plate 122, also typically made of steel or another metal, is secured to the reinforcement plate 118 using a plurality of fasteners 124, such as nuts and bolts or the like. All of these metallic components may also be welded.

The striker 116 includes a plurality of arms, including a front arm 116*a* and a rear arm 116*b* joined by a center section 116*c*, thereby forming a U-shaped structure. An end of each of the front arm 116*a* and the rear arm 116*b* is inserted into a hole 126 manufactured into the attachment plate 122, and the joints are welded or otherwise secured such that the striker 116 is rigidly affixed to the attachment plate 122. Here, however, when the striker 116 and the attachment plate 122 are compressed together (i.e., in opposing directions towards one another) by a sufficient force, the front arm 116*a* and the rear arm 116*b* are adapted to translate through the holes 126 manufactured into the attachment plate 122, thereby reducing the effective length of the striker 116 beyond the attachment plate 122 opposite the reinforcement plate 118 and exterior surface 20. Breakable press fit or welded connections may be used for this purpose. As mentioned above, the striker 116 is adapted to be retained within a latch mechanism coupled to the vehicle 14 when the hood 12 is in a closed configuration. The rigid, but compressible, connection between the striker 116 and the attachment plate 122, reinforcement plate 118, and exterior surface 20 lessens the potential of the striker 116 becoming a potential point of contact, indirectly or directly, when an object contacts the exterior surface 20 from outside the vehicle 14 with sufficient force.

In this embodiment, the reinforcement plate 118 includes a plurality of deflection tabs 130 coincident with the ends of the front arm 116*a* and the rear arm 116*b*. These deflection tabs 130 may each include a substantially rectangular, rounded off, or triangular structure that is cut into or coupled to the reinforcement plate 118. The deflection tabs 130 are contacted by the ends of the front arm 116*a* and the rear arm 116*b* when the front arm 116*a* and the rear arm 116*b* are translated through the associated holes 126 in the attachment plate 118, at which point the deflection tabs 130 are deflected towards the exterior surface 20, thereby providing the front arm 116*a* and the rear arm 116*b* with a degree of constrained movement through the bulk of the reinforcement plate 118 towards the exterior surface 20. Again, the rigid, but compressible, connection between the striker 116 and the attachment plate 122, reinforcement plate 118 (via the deflection tabs 130), and exterior surface 20 lessens the potential of the striker 116 becoming a potential point of contact, indirectly or directly, when an object contacts the exterior surface 20 from outside the vehicle 14 with sufficient force.

Figure 5:
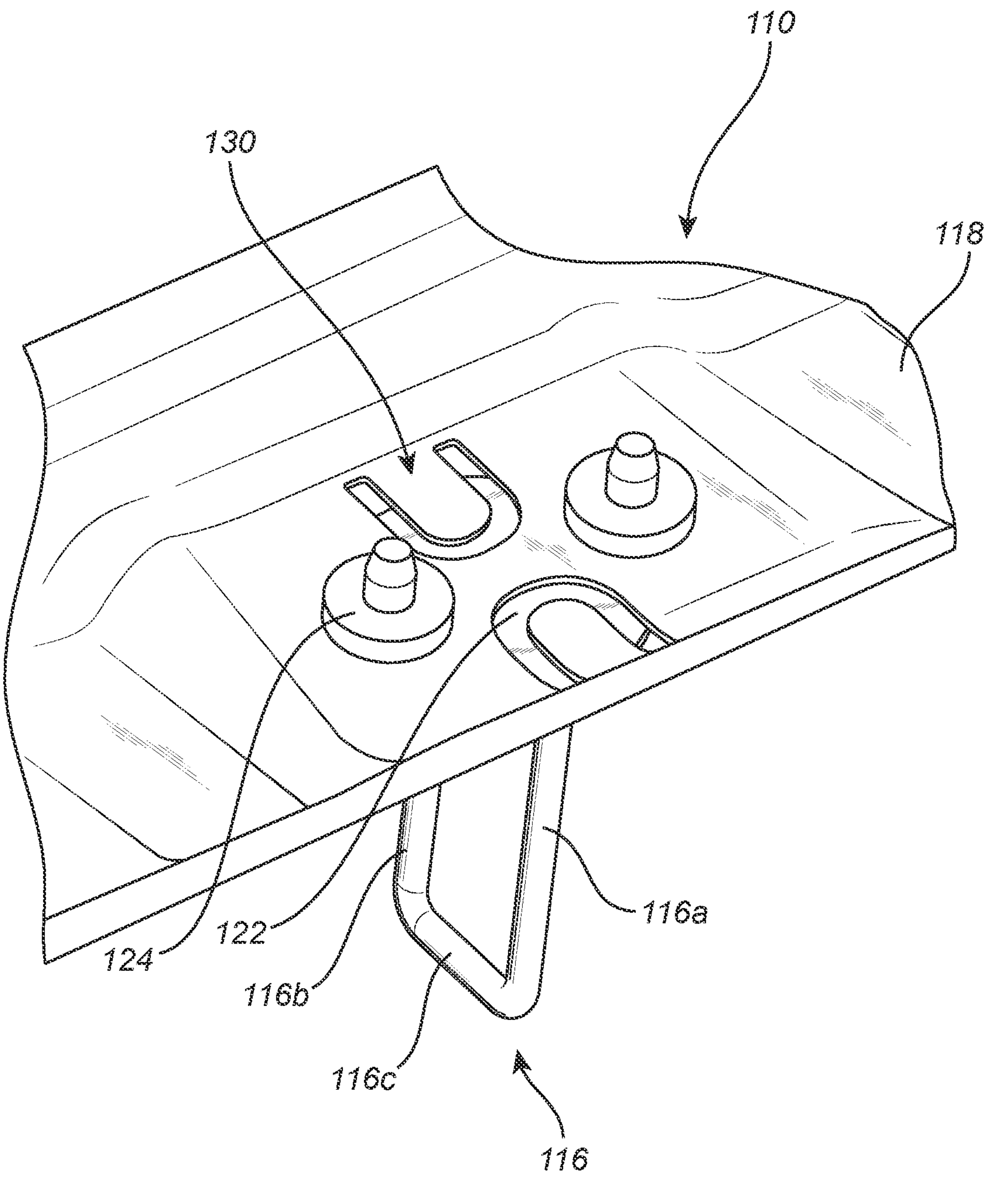
FIG. 5 is another perspective view illustrating one embodiment of the striker assembly of the present disclosure coupled to the reinforcement plate of the hood of the vehicle.

FIG. 5 is another perspective view illustrating one embodiment of the striker assembly 110 of the present disclosure coupled to the reinforcement plate 118 of the hood 12 of the vehicle 14. Again, the reinforcement plate 118 is an elongate structure that is secured to the interior of the exterior surface 20 (FIG. 1) of the hood 12. The reinforcement plate 118 has a concave shape such that a space is created between the reinforcement plate 118 and the exterior surface 20, allowing for attachment of the striker assembly 110 to the reinforcement plate 118 without interference of the exterior surface 20. The reinforcement plate 118 is typically manufactured from steel or another metal and may run any width of the hood 12. The attachment plate 122, also typically made of steel or another metal, is secured to the reinforcement plate 118 using the plurality of fasteners 124, such as nuts and bolts or the like. All of these metallic components may also be welded. Here, the back of the fasteners 124 (e.g., the nuts) is/are accommodated within the space created between the reinforcement plate 118 and the exterior surface 20.

The striker 116 includes a plurality of arms, including the front arm 116*a* and the rear arm 116*b* joined by the center section 116*c*, thereby forming a U-shaped structure. The end of each of the front arm 116*a* and the rear arm 116*b* is inserted into a hole 126 (FIG. 4) manufactured into the attachment plate 122, and the joints are welded or otherwise secured such that the striker 116 is rigidly affixed to the attachment plate 122. Here, when the striker 116 and the attachment plate 122 are compressed together (i.e., in opposing directions towards one another) by a sufficient force, the front arm 116*a* and the rear arm 116*b* are adapted to translate through the holes 126 manufactured into the attachment plate 122, thereby reducing the effective length of the striker 116 beyond the attachment plate 122 opposite the reinforcement plate 118 and exterior surface 20. Breakable press fit or welded connections may be used for this purpose. As mentioned above, the striker 116 is adapted to be retained within a latch mechanism coupled to the vehicle 14 when the hood 12 is in a closed configuration. The rigid, but compressible, connection between the striker 116 and the attachment plate 122, reinforcement plate 118, and exterior surface 20 lessens the potential of the striker 116 becoming a potential point of contact, indirectly or directly, when an object contacts the exterior surface 20 from outside the vehicle 14 with sufficient force.

In this embodiment, the reinforcement plate 118 includes the plurality of deflection tabs 130 coincident with the ends of the front arm 116*a* and the rear arm 116*b*. These deflection tabs 130 may each include a substantially rectangular, rounded off, or triangular structure that is cut into or coupled to the reinforcement plate 118. The deflection tabs 130 are contacted by the ends of the front arm 116*a* and the rear arm 116*b* when the front arm 116*a* and the rear arm 116*b* are translated through the associated holes 126 in the attachment plate 118, at which point the deflection tabs 130 are deflected towards the exterior surface 20, thereby providing the front arm 116*a* and the rear arm 116*b* with a degree of constrained movement through the bulk of the reinforcement plate 118 towards the exterior surface 20. Again, the rigid, but compressible, connection between the striker 116 and the attachment plate 122, reinforcement plate 118 (via the deflection tabs 130), and exterior surface 20 prevents the striker 116 from becoming a potential point of contact, indirectly or directly, when an object contacts the exterior surface 20 from outside the vehicle 14 with sufficient force.

Figure 6:
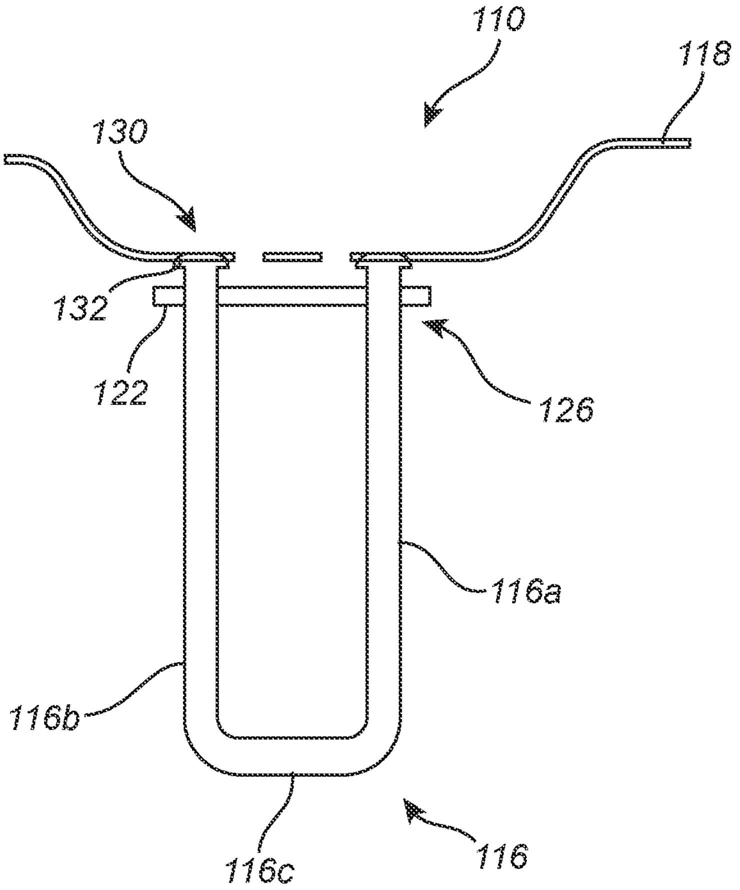
FIG. 6 is a cross-sectional side view illustrating one embodiment of the striker assembly of the present disclosure coupled to the reinforcement plate of the hood of the vehicle.

FIG. 6 is a cross-sectional side view illustrating one embodiment of the striker assembly 110 of the present disclosure coupled to the reinforcement plate 118 of the hood 12 (FIG. 1) of the vehicle 14 (FIG. 1). As illustrated, the end of each of the front arm 116*a* and the rear arm 116*b* is inserted into/through the hole 126 manufactured into the attachment plate 122, and the joints are welded or otherwise secured such that the striker 116 is rigidly affixed to the attachment plate 122. The ends of the front arm 116*a* and the rear arm 116*b* may include widened retention structures 132 that prevent the front arm 116*a* and the rear arm 116*b* from backing out of the holes 126 once the components are joined together. When the striker 116 and the attachment plate 122 are compressed together (i.e., in opposing directions towards one another) by a sufficient force, the front arm 116*a* and the rear arm 116*b* are adapted to translate through the holes 126 manufactured into the attachment plate 122, thereby reducing the effective length of the striker 116 beyond the attachment plate 122 opposite the reinforcement plate 118. Breakable press fit or welded connections may be used for this purpose. The reinforcement plate 118 includes the plurality of deflection tabs 130 coincident with the ends of the front arm 116*a* and the rear arm 116*b*. The deflection tabs 130 are contacted/deflected by the ends of the front arm 116*a* and the rear arm 116*b* when the front arm 116*a* and the rear arm 116*b* are translated through the associated holes 126 in the attachment plate 118, at which point the deflection tabs 130 are deflected towards the exterior surface 20 (FIG. 1), thereby providing the front arm 116*a* and the rear arm 116*b* with the degree of constrained movement through the bulk of the reinforcement plate 118 towards the exterior surface 20. Again, the rigid, but compressible, connection between the striker 116 and the attachment plate 122, reinforcement plate 118 (via the deflection tabs 130), and exterior surface 20 lessens the potential of the striker 116 becoming a potential point of contact, indirectly or directly, when an object contacts the exterior surface 20 from outside the vehicle 14 with sufficient force. It should be noted that, before any translation of the striker 116, the ends of the front arm 116*a* and the rear arm 116*b* may be in contact with the deflection tabs 130, or the ends of the front arm 116*a* and the rear arm 116*b* may be spaced apart from the deflection tabs 130, providing either immediate or delayed deflection of the deflection tabs 130 into the reinforcement plate 118 towards the exterior surface 20 when the striker 116 is translated through the attachment plate 122.

Figure 7:
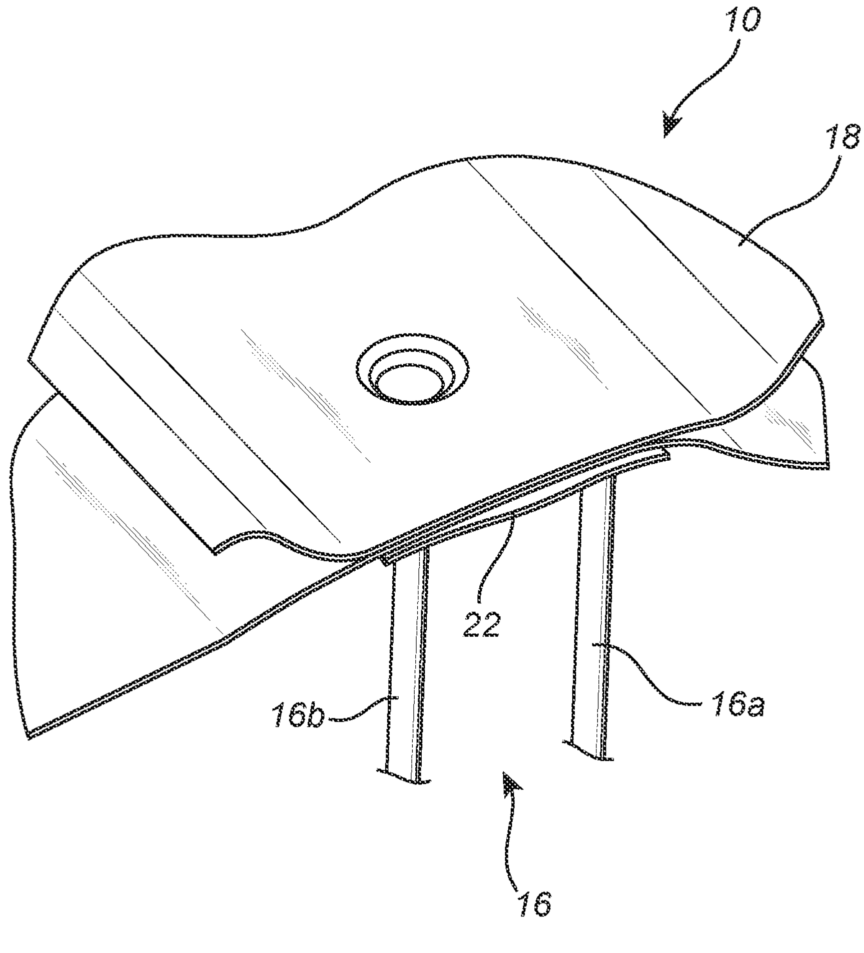
FIG. 7 is a perspective view illustrating the collapsing of the conventional striker assembly towards the exterior surface of the associated hood, tailgate, or other door during an impact event.

FIG. 7 is a perspective view illustrating the collapsing of the conventional striker assembly 10 towards the exterior surface 20 (FIG. 1) of the associated hood 12 (FIG. 1), tailgate, or other door during an impact event. As illustrated, when the exterior surface 20 is contacted from outside the vehicle 14 (FIG. 1), the striker 16 acts as a rigid support with respect to the reinforcement plate 18 and the exterior surface 20 with limited "give." Thus, the striker 16 effectively becomes a point of contact through the reinforcement plate 18 and the exterior surface 20.

Figure 8:
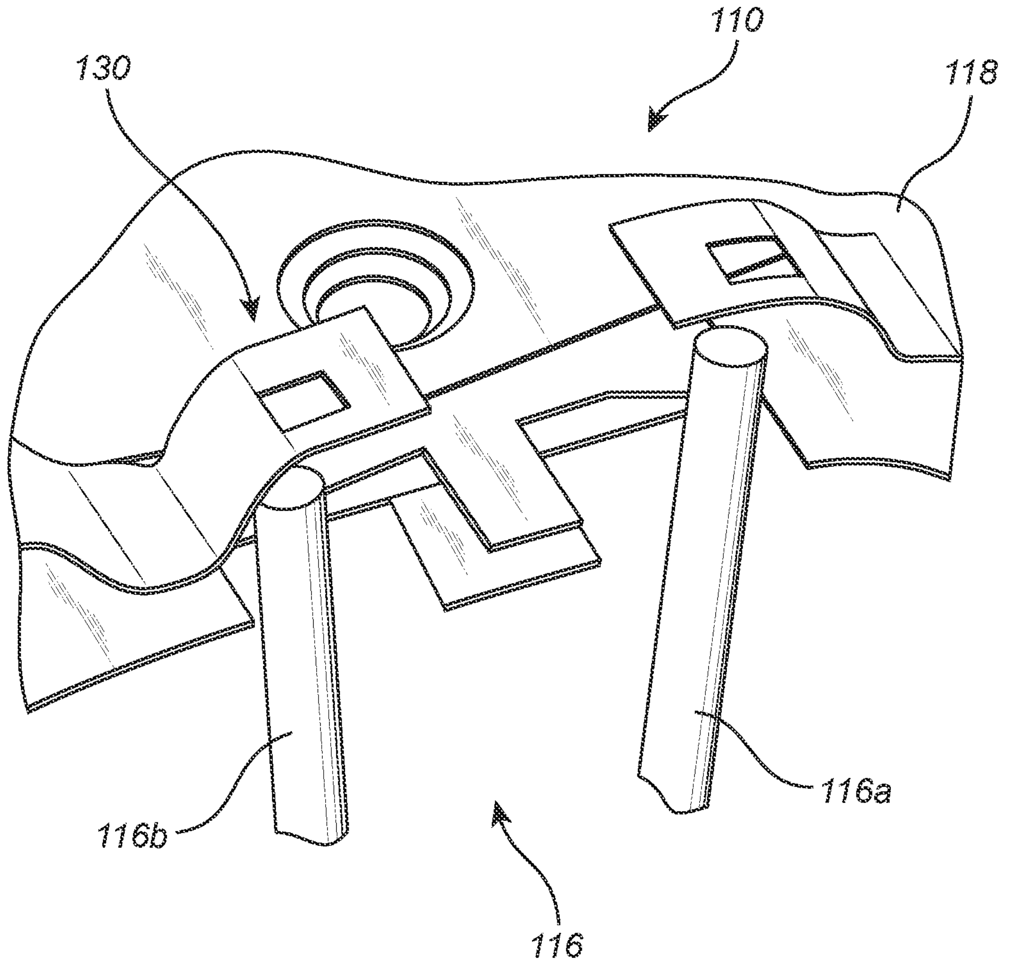
FIG. 8 is a perspective view illustrating the collapsing of the striker assembly of the present disclosure towards the exterior surface of the associated hood, tailgate, or other door during an impact event.

FIG. 8 is a perspective view illustrating the collapsing, or collapsed state, of the striker assembly 110 of the present disclosure towards the exterior surface 20 (FIG. 1) of the associated hood 12 (FIG. 1), tailgate, or other door during or after an impact event. As illustrated, when the exterior surface 20 is contacted from outside the vehicle 14 (FIG. 1), the striker 116 acts as a collapsible support with respect to the reinforcement plate 118 and the exterior surface 20 and allows for a predetermined degree of "give." Thus, the striker 116 does not immediately become a point of contact through the reinforcement plate 118 and the exterior surface 20. The striker 116 and deflection tabs 130 of the reinforcement plate 118 are deflected in a controlled manner with a predetermined degree of force.

Figure 9:
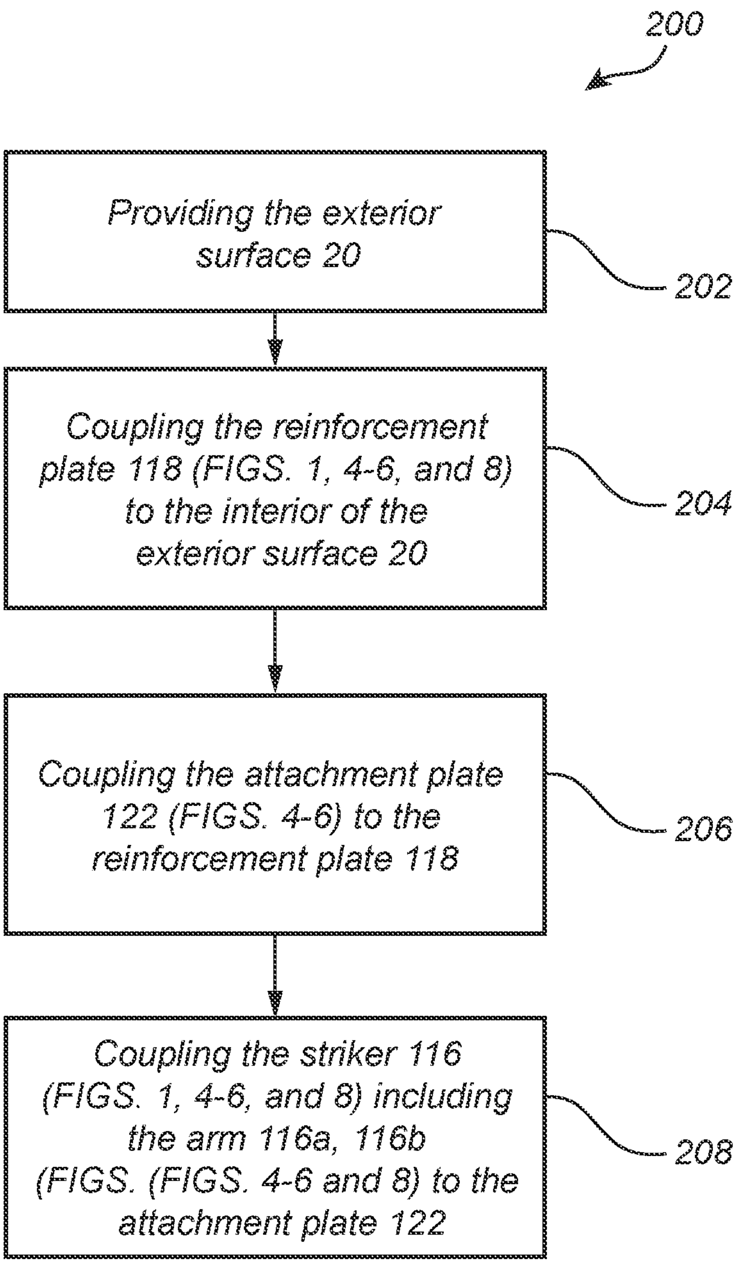
FIG. 9 is a flowchart illustrating one embodiment of a method of providing the striker assembly of the present disclosure in a hood, tailgate, or other door of a vehicle.

FIG. 9 is a flowchart illustrating one embodiment of a method 200 of providing the striker assembly 110 (FIGS. 1, 4-6, and 8) of the present disclosure in a hood 12 (FIG. 1), tailgate, or other door of a vehicle 14 (FIG. 1). The method includes providing the exterior surface 20 (step 202), coupling the reinforcement plate 118 (FIGS. 1, 4-6, and 8) to the interior of the exterior surface 20 (step 204), coupling the attachment plate 122 (FIGS. 4-6) to the reinforcement plate 118 (step 206), and coupling the striker 116 (FIGS. 1, 4-6, and 8) including the arm 116*a*, 116*b* (FIGS. (FIGS. 4-6 and 8) to the attachment plate 122 (step 208), where the arm 116*a*, 116*b* is adapted to translate through the hole 126 (FIGS. 4 and 6) defined by the attachment plate 122 when the attachment plate 122 and the striker 116 are compressed together. The reinforcement plate 118 includes the deflection tab 130 (FIGS. 4-6 and 8), where the arm 116*a*, 116*b* is adapted to contact the deflection tab 130 when the attachment plate 122 and the striker 116 are compressed together and the arm 116*a*, 116*b* translates through the hole 126 defined by the attachment plate 122, thereby deflecting the deflection tab 130 towards the exterior surface 20. It will be readily apparent to those of ordinary skill in the art that the order of these method steps can be varied as desired.

In the embodiment provided, the striker 116 is a U-shaped member including a pair of arms 116*a*, 116*b*, where each of the pair of arms 116*a*, 116*b* is adapted to translate through the associated hole 126 defined by the attachment plate 122 when the attachment plate 122 and the striker 116 are compressed together. The reinforcement plate 118 includes a pair of opposed deflection tabs 130, where each of the pair of arms 116*a*, 116*b* is adapted to contact the associated deflection tab 130 when the attachment plate 122 and the striker 116 are compressed together and each of the pair of arms 116*a*, 116*b* translates through the associated hole 126 defined by the attachment plate 122, thereby deflecting the associated deflection tab 130 towards the exterior surface 20. The method 200 also includes forming the deflection tab(s) 130 by cutting the deflection tab(s) within the interior portion of the reinforcement plate 118.

Although the present disclosure is illustrated and described with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A striker assembly for a vehicle, the striker assembly comprising:

an attachment plate adapted to be coupled to a reinforcement plate of a closure of the vehicle;

a striker comprising at least one arm coupled to the attachment plate, wherein the at least one arm is adapted to translate through at least one hole defined by the attachment plate when the attachment plate and the striker are compressed together; and wherein the at least one arm is adapted to contact at least one deflection tab coupled to the reinforcement plate when the attachment plate and the striker are compressed together and the at least one arm translates through the at least one hole defined by the attachment plate, thereby deflecting the at least one deflection tab towards an exterior surface of the closure.

2. The striker assembly of claim 1, wherein the striker is a U-shaped member, wherein the at least one arm comprises a pair of arms and the at least one hole comprises a pair of holes, wherein each of the pair of arms is adapted to translate through an associated one of the pair of holes defined by the attachment plate when the attachment plate and the striker are compressed together.

3. The striker assembly of claim 2, wherein each of the pair of arms is adapted to contact an associated deflection tab coupled to the reinforcement plate when the attachment plate and the striker are compressed together and each of the pair of arms translates through the associated one of the pair of holes defined by the attachment plate, thereby deflecting the associated deflection tab towards an exterior surface of the closure.

4. The striker assembly of claim 1, wherein the attachment plate defines a plurality of holes adapted to receive a plurality of fasteners for coupling the attachment plate to the reinforcement plate.

5. The striker assembly of claim 1, wherein the closure is a hood, tailgate, or other door of the vehicle and the reinforcement plate is adapted to be coupled to an interior of an exterior surface of the hood, tailgate, or other door.

6. The striker assembly of claim 1, wherein the striker is adapted to be retained within a latch mechanism coupled to the vehicle when the closure is in a closed configuration.

7. A hood of a vehicle, the hood comprising:

an exterior surface;

a reinforcement plate coupled to an interior of the exterior surface;

an attachment plate coupled to the reinforcement plate;

a striker comprising at least one arm coupled to the attachment plate, wherein the at least one arm is adapted to translate through at least one hole defined by the attachment plate when the attachment plate and the striker are compressed together; and wherein the at least one arm is adapted to contact at least one deflection tab coupled to the reinforcement plate when the attachment plate and the striker are compressed together and the at least one arm translates through the at least one hole defined by the attachment plate, thereby deflecting the at least one deflection tab towards an exterior surface of the closure.

8. The hood of claim 7, wherein the striker is a U-shaped member, wherein the at least one arm comprises a pair of arms and the at least one hole comprises a pair of holes, wherein each of the pair of arms is adapted to translate through an associated one of the pair of holes defined by the attachment plate when the attachment plate and the striker are compressed together.

9. The hood of claim 8, wherein the reinforcement plate comprises a pair of deflection tabs, wherein each of the pair of arms is adapted to contact an associated one of the pair of deflection tabs when the attachment plate and the striker are compressed together and each of the pair of arms translates through the associated one of the pair of holes defined by the attachment plate, thereby deflecting the associated one of the pair of deflection tabs towards the exterior surface.

10. The hood of claim 7, wherein the attachment plate defines a plurality of holes adapted to receive a plurality of fasteners for coupling the attachment plate to the reinforcement plate.

11. The hood of claim 7, wherein the striker is adapted to be retained within a latch mechanism coupled to the vehicle when the hood is in a closed configuration.

12. A method of providing a hood of a vehicle, the method comprising:

providing an exterior surface;

coupling a reinforcement plate to an interior of the exterior surface;

coupling an attachment plate to the reinforcement plate;

coupling a striker comprising at least one arm to the attachment plate, wherein the at least one arm is adapted to translate through at least one hole defined by the attachment plate when the attachment plate and the striker are compressed together; and wherein the at least one arm is adapted to contact at least one deflection tab coupled to the reinforcement plate when the attachment plate and the striker are compressed together and the at least one arm translates through the at least one hole defined by the attachment plate, thereby deflecting the at least one deflection tab towards an exterior surface of a closure of the vehicle.

13. The method of claim 12, wherein the striker is a U-shaped member, wherein the at least one arm comprises a pair of arms and the at least one hole comprises a pair of holes, wherein each of the pair of arms is adapted to translate through an associated one of the pair of holes defined by the attachment plate when the attachment plate and the striker are compressed together.

14. The method of claim 13, wherein the reinforcement plate comprises a pair of deflection tabs, wherein each of the pair of arms is adapted to contact an associated one of the pair of deflection tabs when the attachment plate and the striker are compressed together and each of the pair of arms translates through the associated one of the pair of holes defined by the attachment plate, thereby deflecting the associated one of the pair of deflection tabs towards the exterior surface.

15. The method of claim 12, wherein the attachment plate defines a plurality of holes adapted to receive a plurality of fasteners for coupling the attachment plate to the reinforcement plate.

16. The method of claim 12, wherein the striker is adapted to be retained within a latch mechanism coupled to the vehicle when the hood is in a closed configuration.

17. The method of claim 12, further comprising forming the at least one deflection tab by cutting the at least one deflection tab within an interior portion of the reinforcement plate.

* * * * *